(12) United States Patent
Schömig et al.

(10) Patent No.: US 10,648,515 B2
(45) Date of Patent: May 12, 2020

(54) PRESSURE PLATE ASSEMBLY AND VEHICLE

(71) Applicant: ZF Friedrichshafen AG, Friedrichshafen (DE)

(72) Inventors: Peter Schömig, Rimpar (DE); Christian Schmedding, Poppenhausen (DE); Michael Göb, Schwebheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 218 days.

(21) Appl. No.: 15/692,293

(22) Filed: Aug. 31, 2017

(65) Prior Publication Data

US 2018/0087582 A1 Mar. 29, 2018

(30) Foreign Application Priority Data

Sep. 26, 2016 (DE) .......................... 10 2016 218 459

(51) Int. Cl.
*F16D 13/75* (2006.01)
*F16D 13/71* (2006.01)
*F16D 125/64* (2012.01)

(52) U.S. Cl.
CPC ........... *F16D 13/757* (2013.01); *F16D 13/71* (2013.01); *F16D 2125/64* (2013.01); *F16D 2300/18* (2013.01)

(58) Field of Classification Search
USPC ..................................................... 192/111.3
See application file for complete search history.

(56) References Cited

U.S. PATENT DOCUMENTS

| | | | | |
|---|---|---|---|---|
| 2,183,668 A | * | 12/1939 | Burkhardt ............... | F16D 13/75 188/196 V |
| 4,191,285 A | * | 3/1980 | Thelander, Sr. ...... | F16D 13/757 188/196 R |
| 4,588,052 A | * | 5/1986 | Courbot ............... | F16D 65/563 188/196 BA |
| 5,349,882 A | * | 9/1994 | Kamio .................... | F16D 1/12 192/111.18 |
| 5,377,803 A | * | 1/1995 | Link .................... | F16D 13/757 192/111.3 |
| 5,887,689 A | * | 3/1999 | Young ................... | F16D 13/757 192/70.252 |
| 6,029,788 A | | 2/2000 | Weidinger et al. | |
| 6,457,572 B1 | * | 10/2002 | Dau ..................... | F16D 13/385 192/111.3 |

FOREIGN PATENT DOCUMENTS

| | | |
|---|---|---|
| DE | 19731611 | 1/1999 |
| DE | 10032668 | 1/2002 |
| EP | 0568990 A2 | 11/1993 |
| JP | H 03-129129 | 6/1991 |

* cited by examiner

*Primary Examiner* — Mark A Manley
(74) *Attorney, Agent, or Firm* — Cozen O'Connor

(57) ABSTRACT

A pressure plate assembly for a motor vehicle with a wear compensation mechanism which comprises a sensor element for sensing wear, wherein the sensor element has an angle lever or is constructed as an angle lever; and a motor vehicle, including such wear compensation mechanism.

11 Claims, 5 Drawing Sheets

PRESSURE PLATE ASSEMBLY AND VEHICLE

BACKGROUND OF THE INVENTION

1. Field of the Invention

The invention is directed to a pressure plate assembly for a motor vehicle with a wear compensation mechanism comprising a sensor element for sensing wear.

2. Description of the Related Art

During the life of a clutch, the clutch disk lining among others experiences wear so that the engagement position of the diaphragm spring changes. To compensate for this wear, it is known to provide a wear compensation mechanism. Wear compensation mechanisms of this type usually comprise opposed ramps, whereby a plurality of ramps is usually arranged one behind the other in circumferential direction. The corresponding opposed ramps are then located opposite the first ramps in axial direction.

The wear compensation mechanisms have different devices for sensing wear. In a first wear compensation mechanism, a locked slide is released when the sensor, which is formed as a pin, lifts the locking element from the slide.

In another wear compensation mechanism, a drive pawl drives a spindle drive in that it moves a pinion when there is any wear present. In this case, the drive pawl is the sensor for sensing wear.

Because of the design of the sensor, the adjusting mechanism for adjusting one of the ramp units is elaborate and expensive.

SUMMARY OF THE INVENTION

To solve this problem it is provided that the sensor element has an angle lever or is constructed as an angle lever. In an angle lever, an angle is located either between the lever arms or at a lever arm. The construction of the sensor element can be simplified in this way. In particular, this is an especially simple possibility for converting wear which is sensed in axial direction into a movement in circumferential direction.

The pressure plate assembly is that component of the clutch that contains the pressure plate, also known as pressure plate. A clutch further comprises a clutch disk and a flywheel.

The angle between the lever arms of the angle lever can preferably be a reflex angle. In this regard, the pivot point of the angle lever is not necessarily between the lever arms, but this represents an advantageous embodiment. Accordingly, the angle at a lever arm or between the lever arms of the angle lever is between 180 degrees and 360 degrees. The angle can preferably be in a range between 180 degrees and 270 degrees.

The angle lever can advantageously be mounted in a central area of the lever. The bearing support need not be carried out exactly in the center of the angle lever but is in no case at an end of a lever arm.

In a particularly advantageous manner, the angle lever has an articulated portion and two curved portions proceeding therefrom. The articulated portion forms the bearing point of the angle lever. The curved portions proceeding therefrom allow an incoming force and incoming path to be translated into an outgoing force and an outgoing path in an exactly adjustable manner. The curved portions can advantageously be arranged to extend in opposing direction. The respective contact surfaces can be adjusted in an optimal manner in this way.

The angle lever can advantageously be fastened on the pressure plate. It can be mounted either directly on the pressure plate or at a component part which is fixedly connected to the pressure plate.

The angle lever can preferably contact a drive element by one lever arm for displacement of at least one element which compensates wear. The angle lever allows the sensing of wear to be deflected from the axial direction into a circumferential direction. Therefore, the drive element can engage directly at the sensor element, namely the angle lever. The drive element is then also preferably mounted at the pressure plate, specifically at a bearing support together with the angle lever.

As was described above, a drive element is preferably provided for displacing at least one wear-compensating element. The latter is preloaded in wear-compensating direction. The drive element is provided for displacing a ramp ring relative to a second ramp ring. In this regard, the drive element can either be preloaded itself in order to displace a ramp ring in wear-compensating direction or, alternatively, the ramp ring can also be preloaded and the drive element always makes enough room for the ramp ring to move.

The angle lever can preferably pass on a force acting in an axial direction into a circumferential direction. As was described above, the drive element can advantageously be directly engaged in this way so that wear that is sensed can be transformed directly into a corrective movement.

The compensating mechanism can advantageously have two opposed ramp arrangements.

The sensor surface of the angle lever can preferably contact a ramp which is displaceable in circumferential direction. The ramp is preferably fastened to a ramp ring of the compensating mechanism, specifically to the moveable ramp ring. When configured in a corresponding manner, the ramp can show housing wear so that the angle lever can sense not only lining wear of the clutch disk but also housing wear.

The angle lever can advantageously sense the distance between a pressure plate and a diaphragm spring. As has already been described, a ramp can be arranged therebetween in addition.

In addition, the present invention is directed to a motor vehicle with a clutch. This is characterized in that the clutch is constructed in the manner described above.

BRIEF DESCRIPTION OF THE DRAWINGS

Further advantages, features and details of the present invention are set forth in the following description of embodiment examples and drawings in which.

DETAILED DESCRIPTION OF THE PRESENTLY PREFERRED EMBODIMENTS

Figure 1:
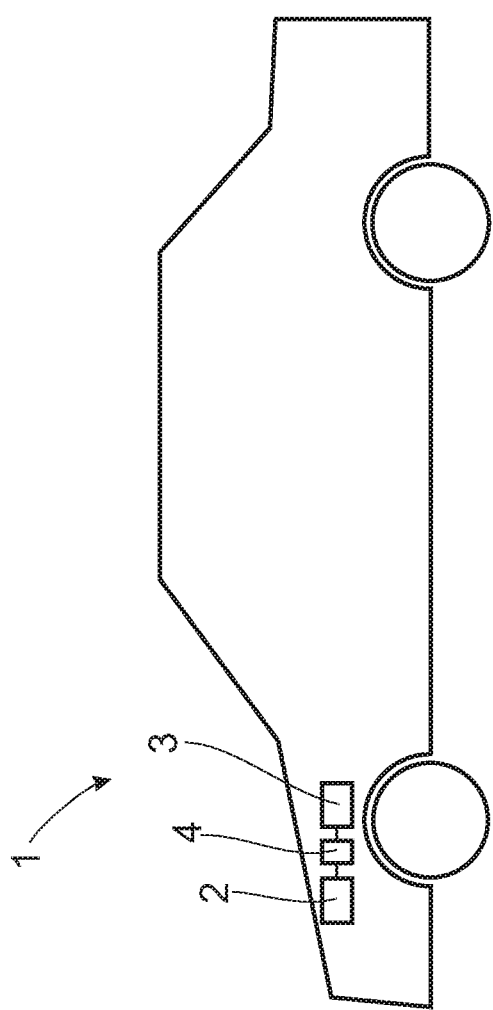
FIG. 1 is schematic view of a motor vehicle.

FIG. 1 shows a motor vehicle 1 with a drive unit 2, a gear unit 3 and a clutch 4 arranged between drive unit 2 and gear unit 3. The drive unit 2 can be an internal combustion engine or an electric motor. The drive unit 2 can also be coupled to the gear unit 3 such that the drive unit 2 can constitute an auxiliary drive, i.e., further drive units and clutches may be provided. Accordingly, motor vehicle 1 can have a powertrain with an internal combustion engine, a hybrid powertrain or a purely electric powertrain. Further, the wear compensation mechanism described herein can also be used in dual clutches or multi-disk clutches provided they have pressure plates.

Figure 2:
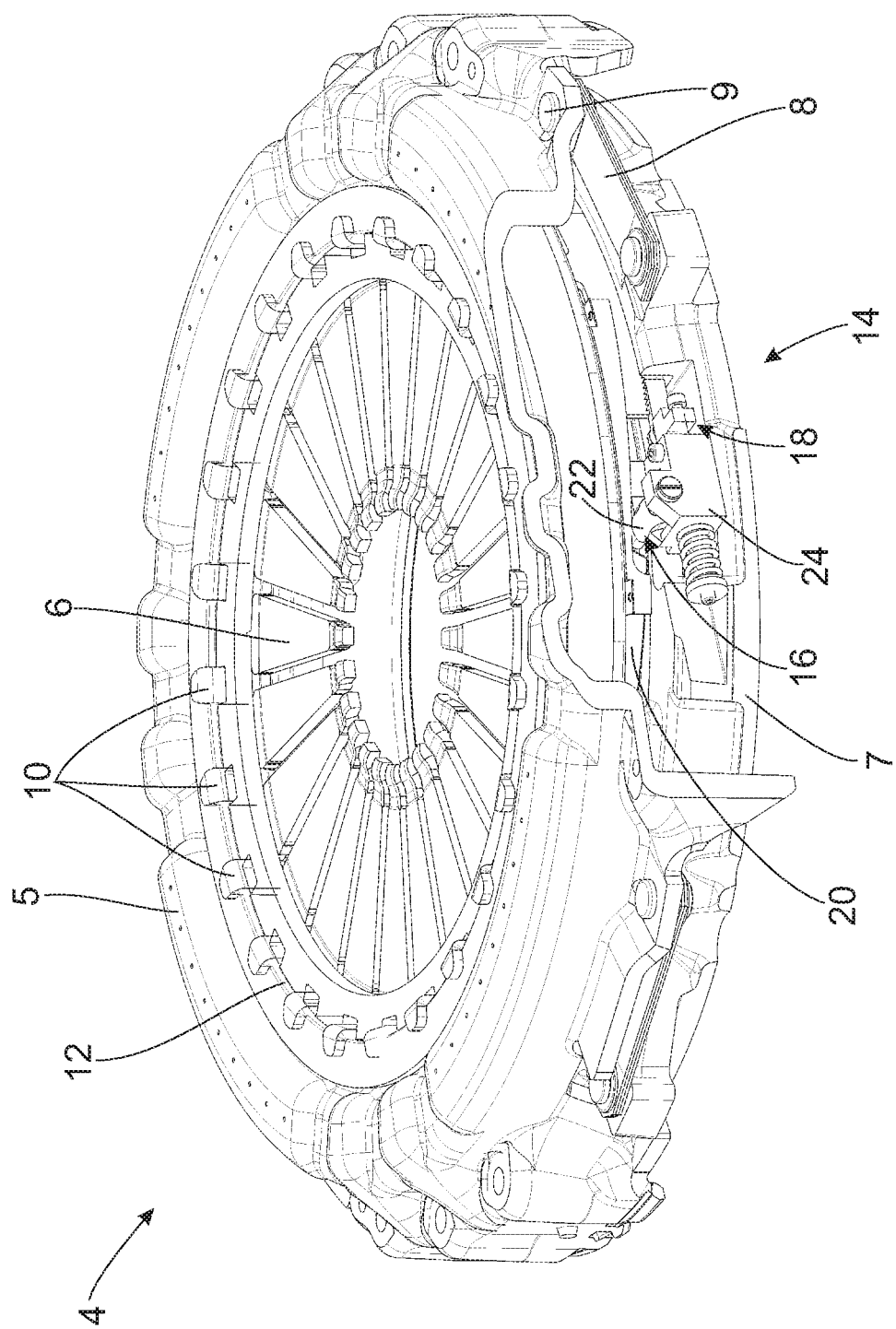
FIG. 2 is a partial sectional view of a clutch of the present invention.

FIG. 2 shows the clutch 4 and the pressure plate assembly thereof in detail. The basic component parts of the clutch 4 include the clutch housing 5, a diaphragm spring 6 and a pressure plate 7. The pressure plate 7 and the clutch housing 5 are rotatably and axially movably connected to one another via leaf springs or leaf spring assemblies 8. The leaf spring assemblies 8 are fastened to the clutch housing 5 and the pressure plate 7 by rivets 9.

The diaphragm spring 6 is mounted at the clutch housing 5 via spacer pins 10, and the spacer pins 10 are fastened by a retaining ring 12.

Further, the clutch 4 comprises a wear compensation mechanism 14.

A wear compensation mechanism 14 usually comprises a sensor element 16, a drive unit 18 and a compensating mechanism 20 which cooperate in the following manner:

The sensor element 16 senses wear of the clutch disk lining, which activates the drive unit 18 which usually brings about a displacement of the compensating mechanism 20 when a threshold value is exceeded so that the wear, for example, wear of the clutch disk lining, is compensated.

The compensating mechanism 20 usually comprises as wear compensating element two ramp arrangements with opposed ramps 38a and 38b.

In the present invention, the sensor element 16 is constructed as an angle lever 22. This results in an advantageous construction of the wear compensation mechanism 14.

A bearing support 24 supports the angle lever 22 and the drive unit 18. The bearing support 24 is fastened to the pressure plate 7. The drive unit 18 also comprises a spring 28 in addition to a tie rod 26 which can be driven via the angle lever 22. The spring 28 preloads the tie rod 26 in wear wear compensation direction. The spring 28 or, broadly speaking, the preloading element 28, also preloads the angle lever 22.

This results in a preferred or basic position both for the drive unit 18 and for the sensor element 16. The construction is very compact because only one preloading element 28 is used for both drive unit 18 and sensor element 16.

Figure 3:
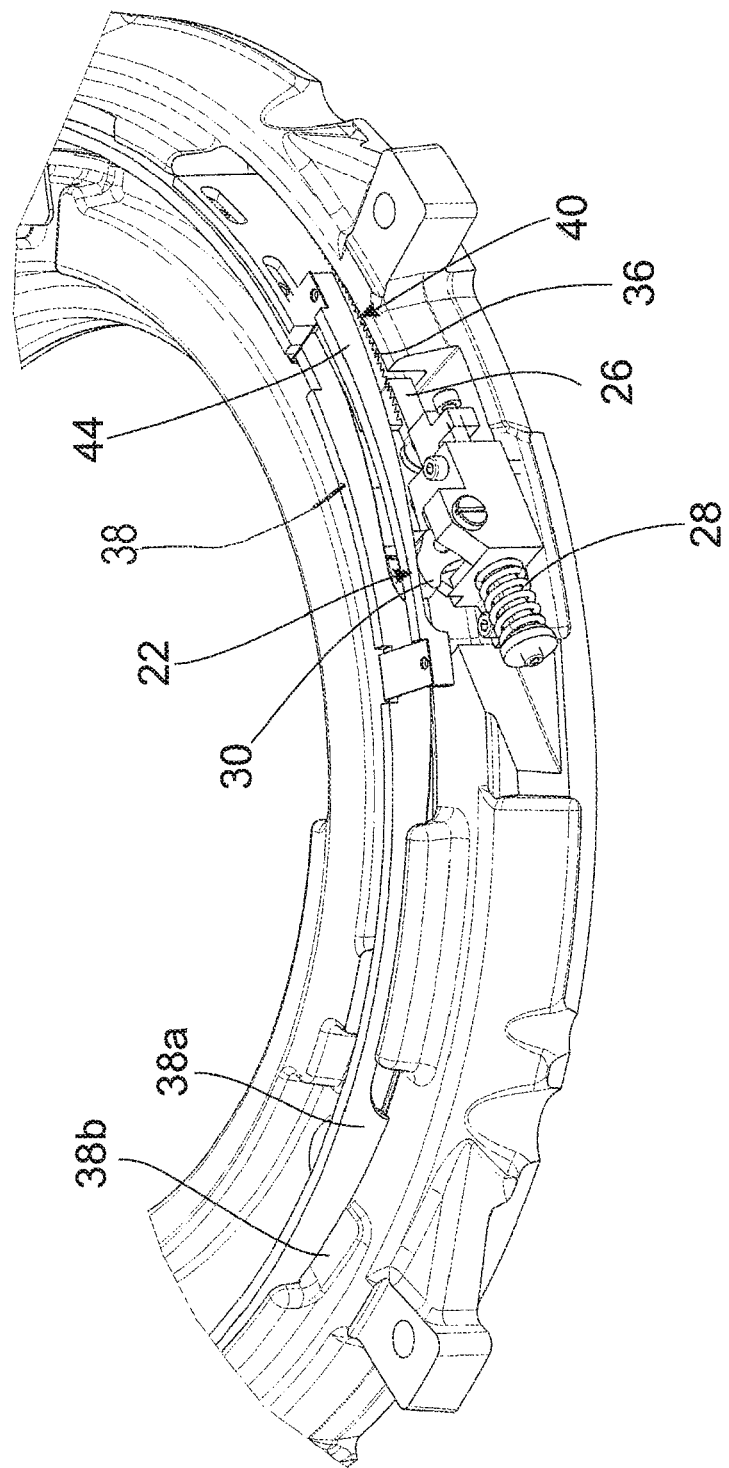
FIG. 3 is an enlarged sectional view of the clutch of FIG. 2.

The operation of the wear compensation mechanism 14 is described referring to FIG. 3. During engagement, the outer part of the diaphragm spring 6 moves in the direction of the pressure plate 7. The greater the wear, or in the presence of wear, the shorter the distance between diaphragm spring 6 and pressure plate 7 so that the angle lever 22 is pressed at its lever arm 30 farther in direction of the pressure plate 7.

Because of the bearing support of the angle lever 22 by the articulated portion 32, the lever arm 34 is increasingly pushed toward the right with increasing wear, this being the direction opposite the preloading of the drive unit 18.

If the wear is sufficient, the tie rod 26 moves a tooth 40 of the plurality of teeth 36 farther. The teeth 36 are fixedly connected to ramp ring 38 which is that ramp ring of the compensation device that is movable. The teeth 36 can be fixedly connected to ramp ring 38, they can be incorporated directly in ramp ring 38, but they can also be located, for example, on a plate which is fixedly connected to ramp ring 38. In every case, the tie rod 26 hooks into the next tooth 40 when a predetermined path is exceeded. When the clutch 4 is next disengaged, ramp ring 38 is released and can be moved by spring 28 in clockwise direction until the drive unit 18 is again in its basic position.

Also fastened to the ramp ring 38 is a ramp member 44 which forms the countersurface to the sensor surface of the angle lever 22 at the lever arm 30 thereof. Ramp member 44 is not compulsory; the angle lever 22 can also sense wear directly at the diaphragm spring 6.

Accordingly, the sensor surface is on lever arm 30 which comes in contact with ramp member 44 when diaphragm spring 6 moves toward the pressure plate 7. Ramp member 44 is connected to ramp ring 38 so as to be fixed with respect to rotation relative to it so that when ramp ring 38 is rotated, the ramp member 44 is rotated to the same extent. By ramp member 44, wear of the housing is included in the overall compensation. The compensating mechanism 20 can then compensate not only lining wear but also housing wear.

Figure 4:
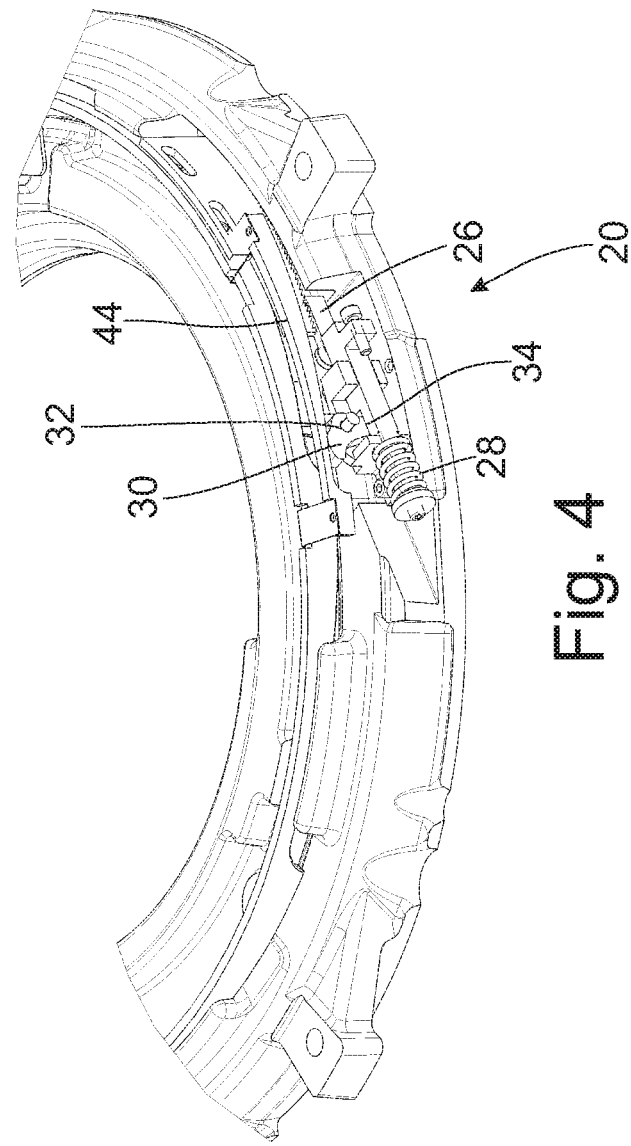
FIG. 4 shows the sectional view of FIG. 2 without the front wall of the bearing support.

FIG. 4 shows the compensating mechanism 20 from the same perspective as FIG. 3, but the front wall of the bearing support 24 is omitted so that the construction is more easily viewable. The articulated portion 32 and the lever arm 34 in particular can be seen in this view. It can be seen particularly that the angle lever 22 has, as lever arms 30 and 34, two curved portions proceeding from the articulated portion 32 and that the curved portions are arranged in opposite directions. The angle 35 between the lever arms 30 and 34 is a reflex angle, that is, between 180° and 270°.

Figure 5:
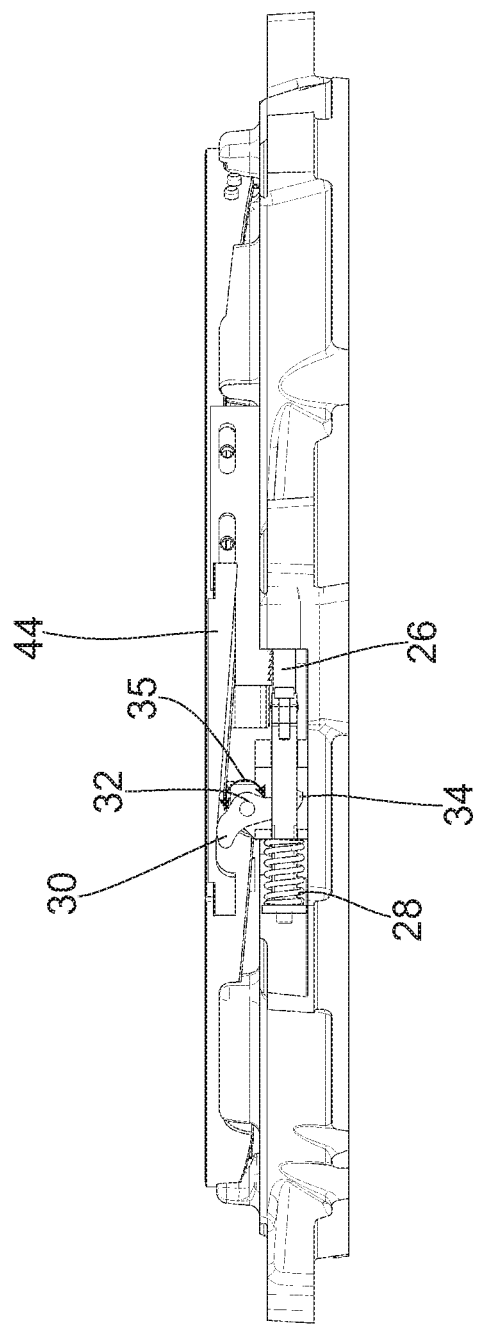
FIG. 5 is a sectional side view of the compensating mechanism of the clutch of the present invention.

FIG. 5 shows the compensating mechanism 20 and part of the clutch 4 in a side view. The bearing support 24, tie rod 26, angle lever 22 and ramp member 44 can be seen. The tie rod 26 has a cutout in which the angle lever 22 lies and engages. Accordingly, the tie rod can cooperate on the one hand with the preloading element, namely, spring 28, and can be driven at the same time by the sensor element 16, namely, the angle lever 22.

Figure 6:
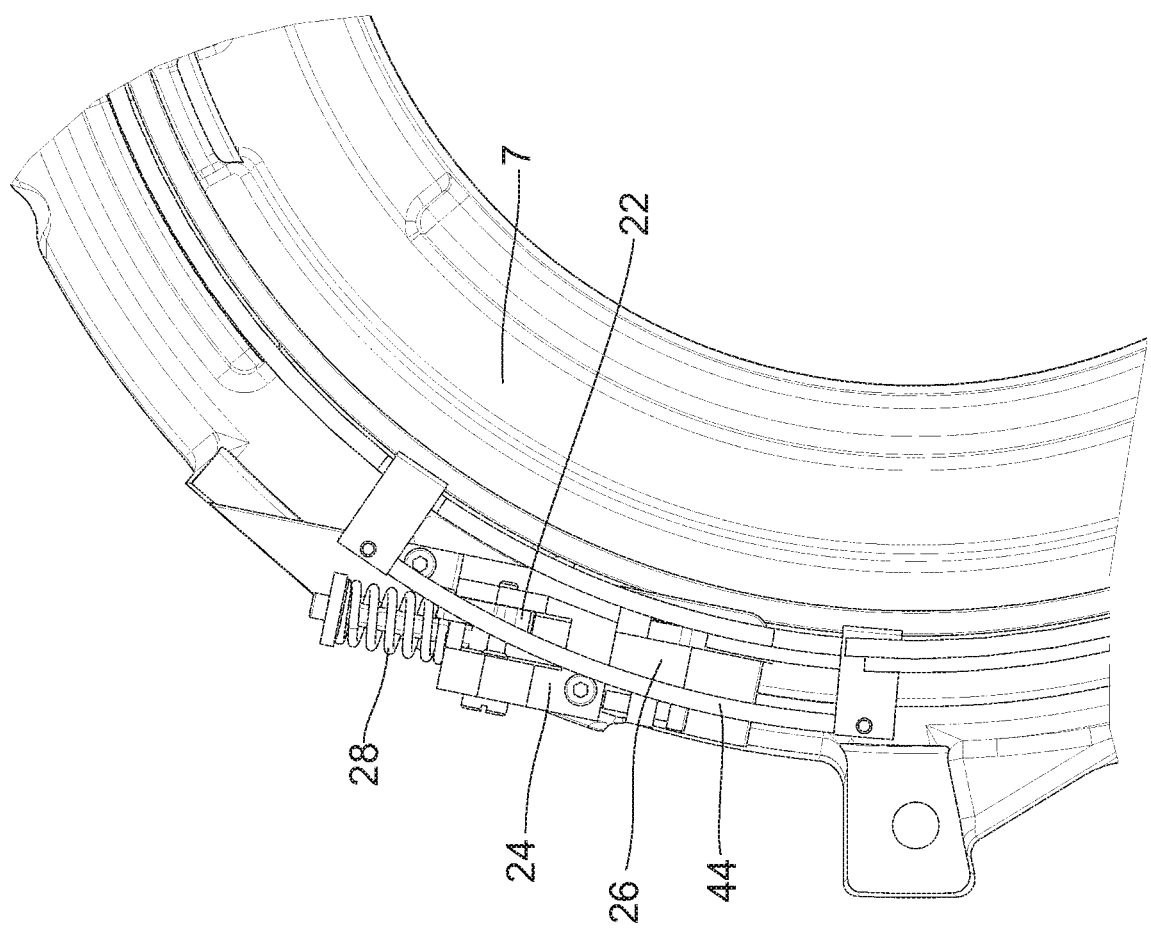
FIG. 6 is a sectional top view of the compensating mechanism of the clutch of the present invention.

FIG. 6 shows the compensating mechanism 20 and part of the clutch 4 in a top view. It can also be seen in this view that the tie rod 26 has a cutout in which the angle lever 22 lies and engages.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pressure plate assembly for a motor vehicle comprising: a wear compensation mechanism including a sensor element for sensing wear, said sensor element comprising an angle lever;
   wherein said angle lever comprises a central area and lever arms pivotally mounted in said central area;
   wherein said angle lever further comprises an articulated portion and two curved portions proceeding therefrom forming said lever arms, and wherein said curved portions are arranged to extend in opposing directions; and
   additionally comprising a drive unit and at least one wear compensating element which is preloaded in a rotational wear-compensating direction and wherein said drive unit is constructed to displace said at least one wear-compensation element, responsive to movement of said angle lever, and wherein said sensor element is constructed to sense the distance between a pressure plate and a diaphragm spring.

2. The pressure plate assembly according to claim 1, wherein said angle lever comprises lever arms and wherein the angle between said lever arms of said angle lever is a reflex angle.

3. The pressure plate assembly according to claim 1, additionally comprising an energy storage device.

4. The pressure plate assembly according to claim 1, additionally comprising a pressure plate and wherein said angle lever is fastened on said pressure plate.

5. The pressure plate assembly according to claim 1, additionally comprising a drive unit and wherein said angle lever contacts said drive unit by one lever arm for displacement of at least one element which compensates wear.

6. The pressure plate assembly according to claim 1, wherein said angle lever is constructed to pass on a force acting in axial direction into a force acting in circumferential direction.

7. The pressure plate assembly according to claim 1, wherein said wear compensation mechanism comprises two ramp arrangements which are opposed to each other.

8. The pressure plate assembly according to claim 1, wherein said angle lever comprises a sensor surface; said plate assembly additionally comprising a ramp member which is displaceable in circumferential direction; and wherein said sensor surface of said angle lever contacts said ramp member.

9. The pressure plate assembly according to claim 1, additionally comprising a pressure plate and wherein a bearing support for supporting said angle lever, a drive element and a preloading element are arranged at said pressure plate.

10. The pressure plate assembly according to claim 3, wherein said energy storage device is a diaphragm spring.

11. A motor vehicle having a pressure plate assembly constructed according to claim 1.

* * * * *